(12) United States Patent  (10) Patent No.: US 8,887,236 B2
Bugenhagen  (45) Date of Patent: Nov. 11, 2014

(54) SYSTEM AND METHOD FOR INTEGRATED SERVICE ACCESS

(75) Inventor: Michael K. Bugenhagen, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 326 days.

(21) Appl. No.: 12/769,203

(22) Filed: Apr. 28, 2010

(65) Prior Publication Data

US 2010/0257591 A1 Oct. 7, 2010

Related U.S. Application Data

(63) Continuation of application No. 11/508,052, filed on Aug. 22, 2006, now Pat. No. 7,742,487.

(51) Int. Cl.
*G06F 7/04* (2006.01)
*H04L 12/54* (2013.01)

(52) U.S. Cl.
CPC .................................. *H04L 12/5692* (2013.01)
USPC ............................................................. 726/3

(58) Field of Classification Search
USPC .................... 726/2–5, 6, 7; 713/168; 709/212, 709/227–229
See application file for complete search history.

(56) References Cited

U.S. PATENT DOCUMENTS

| 5,742,668 | A | * | 4/1998 | Pepe et al. | 455/415 |
|---|---|---|---|---|---|
| 5,898,673 | A | | 4/1999 | Riggan et al. | |
| 5,953,319 | A | | 9/1999 | Dutta et al. | |
| 5,983,098 | A | | 11/1999 | Gerszberg et al. | |
| 5,991,292 | A | | 11/1999 | Focsaneanu et al. | |
| 5,995,726 | A | | 11/1999 | Dillon | |
| 6,137,802 | A | * | 10/2000 | Jones et al. | 370/401 |
| 6,201,797 | B1 | | 3/2001 | Leuca et al. | |
| 6,205,473 | B1 | | 3/2001 | Thomasson et al. | |
| 6,356,757 | B1 | | 3/2002 | Sawyer et al. | |
| 6,373,847 | B1 | | 4/2002 | Scoggins et al. | |
| 6,449,259 | B1 | | 9/2002 | Allain et al. | |
| 6,615,034 | B1 | | 9/2003 | Alloune et al. | |
| 6,681,116 | B1 | | 1/2004 | Johnson | |
| 6,886,030 | B1 | | 4/2005 | Easterbrook et al. | |
| 6,940,827 | B2 | | 9/2005 | Li et al. | |
| 6,968,376 | B2 | | 11/2005 | Horie et al. | |
| 7,003,580 | B1 | | 2/2006 | Cook | |
| 7,155,160 | B2 | | 12/2006 | Ichiyoshi | |
| 7,307,956 | B2 | | 12/2007 | Kaplan et al. | |
| 7,539,175 | B2 | * | 5/2009 | White et al. | 370/350 |
| 7,742,487 | B2 | | 6/2010 | Bugenhagen | |
| 8,443,100 | B1 | * | 5/2013 | Khan | 709/232 |
| 2004/0028009 | A1 | | 2/2004 | Dorenbosch et al. | |
| 2006/0079178 | A1 | * | 4/2006 | Palin et al. | 455/41.2 |
| 2006/0104292 | A1 | * | 5/2006 | Gupta et al. | 370/401 |
| 2007/0110052 | A1 | * | 5/2007 | Kok et al. | 370/389 |
| 2008/0148123 | A1 | * | 6/2008 | Pendakur et al. | 714/748 |

OTHER PUBLICATIONS

Holmes et al, IMiS-Ericsson, 102 pages, May 1998.

* cited by examiner

*Primary Examiner* — Beemnet Dada
(74) *Attorney, Agent, or Firm* — Swanson & Bratschun, L.L.C.

(57) ABSTRACT

A method of operating a service provider system comprising receiving first traffic, determining a first traffic type of the first traffic from a plurality of traffic types, selecting the first communication link from a plurality of communication links based on the first traffic type, and transmitting the first traffic on a first communication link to a communication system.

5 Claims, 10 Drawing Sheets

SYSTEM AND METHOD FOR INTEGRATED SERVICE ACCESS

RELATED APPLICATIONS

This application is a continuation of U.S. patent application Ser. No. 11/508,052 filed on Aug. 22, 2006 now U.S. Pat. No. 7,742,487 entitled SYSTEM AND METHOD FOR INTEGRATED SERVICE ACCESS; the entire teachings of which are incorporated herein by reference.

BACKGROUND OF THE INVENTION

1. Field of the Invention

The invention relates to telecommunications, and in particular, to a system and method for integrated service access.

2. Description of the Prior Art

Wireless communication customers have become increasingly concerned with privacy and security. While the quality of wireless access technology has increased dramatically as of late, providing security over wireless access remains a daunting challenge to service providers because wireless communications are transmitted over open airwaves.

In contrast, many wireline access technologies offer greater security advantages than wireless access technologies because wireline communications are not transmitted over open airwaves. For example, digital subscriber line (DSL) technologies are typically more secure than wireless access technologies because DSL communications travel over wired connections. Unfortunately, prior art systems fail to deliver the security of wireline communications while retaining the flexibility of wireless communications.

SUMMARY OF THE INVENTION

In an embodiment, a service provider system comprises an interface and a processing system. The interface is configured to receive first traffic and transmit the first traffic on a first communication link to a communication system. The processing system is configured to determine a first traffic type of the first traffic from a plurality of traffic types and select the first communication link from a plurality of communication links based on the first traffic type.

In an embodiment, the interface is further configured to receive second traffic and the processing system is further configured to determine a second traffic type from the plurality of traffic types and select a second communication link from the plurality of communication links based on the second traffic type and the interface is further configured to transmit the second traffic on the second communication link.

In an embodiment, the first communication link comprises a wireless communication link and the second communication link comprises a wireline communication link.

In an embodiment, the first traffic type comprises best effort traffic and the second traffic type comprises real-time traffic.

In an embodiment, the first traffic type comprises public traffic and the second traffic type comprises secure traffic.

In an embodiment, a method of operating a service provider system comprises receiving first traffic, determining a first traffic type of the first traffic from a plurality of traffic types, selecting the first communication link from a plurality of communication links based on the first traffic type, and transmitting the first traffic on a first communication link to a communication system.

In an embodiment, a communication network comprises a communication system and a service provider system. The communication system is configured to receive first traffic, determine a first traffic type of the first traffic from a plurality of traffic types, select a first communication link from a plurality of communication links based on the first traffic type, and transmit the first traffic on the first communication link. The service provider system is coupled to the communication system by the plurality of communication links and is configured to receive the first traffic on the first communication link and transmit the first traffic to a destination.

In an embodiment, a method of operating a communication network comprises receiving first traffic in a communication system, determining a first traffic type of the first traffic from a plurality of traffic types, selecting a first communication link from a plurality of communication links based on the first traffic type, transmitting the first traffic on the first communication link from the communication system, receiving in a service provider system the first traffic on the first communication link, and transmitting the first traffic to a destination.

In an embodiment, a communication system comprises a user device configured to transmit first traffic and an access device coupled to the user device and configured to provide the user device with access to a service provider system, receive the first traffic from the user device, process the first traffic to determine a first traffic type of the first traffic from a plurality of traffic types, select the first communication link from a plurality of communication links based on the first traffic type, and transmit the first traffic on a first communication link to the service provider system.

In an embodiment, the communication system may identify specific traffic types or communications sessions and choose to intentionally split the sessions of traffic types over separate communications links thereby making the traffic interception more difficult.

BRIEF DESCRIPTION OF THE DRAWINGS

The same reference number represents the same element on all drawings.

DETAILED DESCRIPTION

FIGS. 1-10 and the following description depict various embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
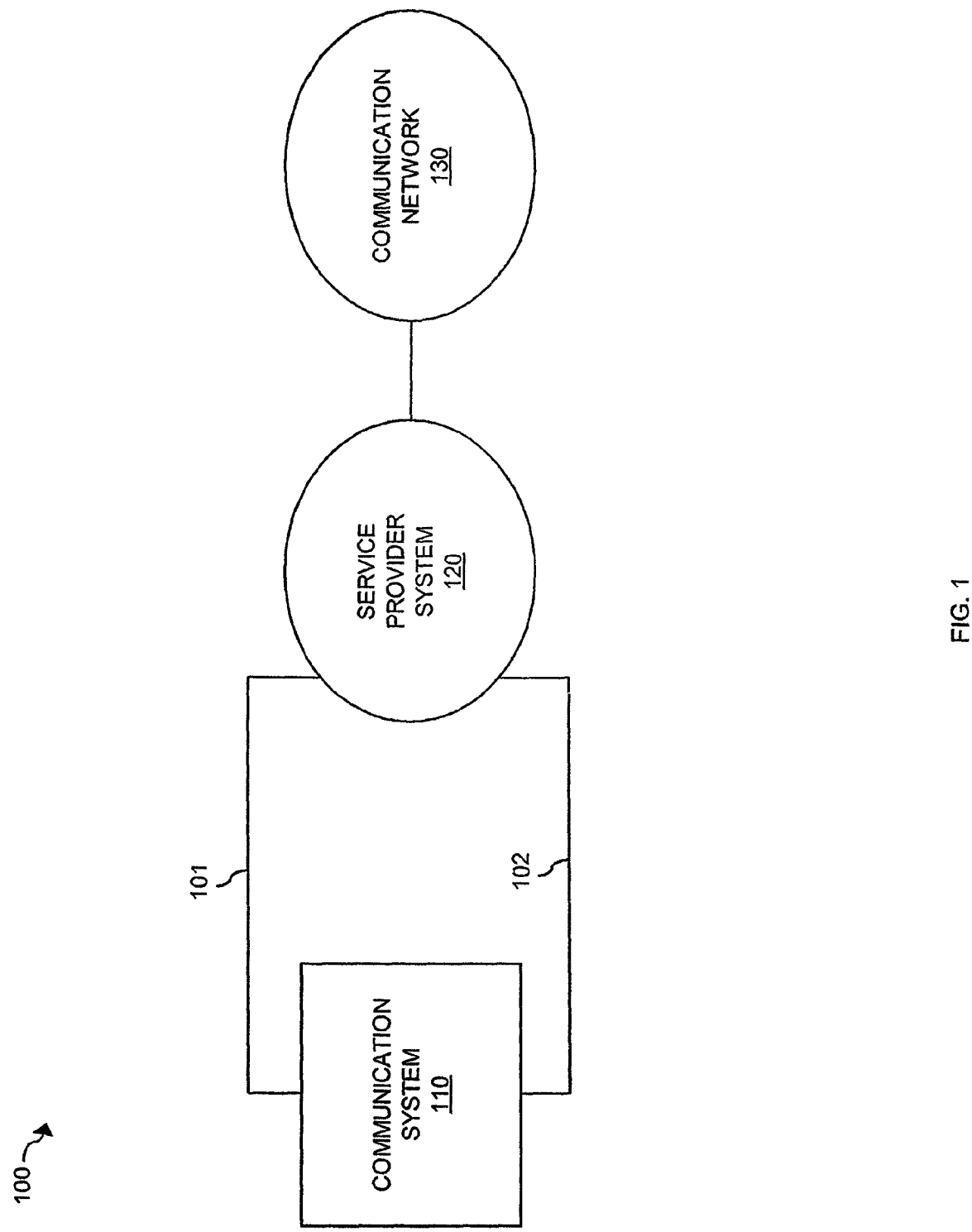
FIG. 1 illustrates a communication network in an embodiment of the invention.

FIG. 1 illustrates communication network 100 in an embodiment of the invention. Communication network 100 includes communication system 110, service provider system 120, and communication network 130. Communication system 110 is coupled to service provider system 120 by communication link 101 and communication link 102.

Communication system 110 could be any system or collection of systems capable of communicating with service provider system 120 and communication network 130 over communication link 101 or communication link 102.

Communication link 101 could be a different type of communication link than communication link 102. For example, communication link 101 could be a wireless communication link, whereas communication link 102 could be a wireline or second type of wireless communication link. Other types of communication links are possible.

Service provider system 120 could be any system capable of providing services to communication system 110. For example, service provider system 120 could provide communication system 110 with access service to communication network 130.

Communication network 130 could be any network or collection of networks capable of providing communication services to communication system 110. For example, communication network 130 could comprise a public Internet, a private Intranet, a wide area network (WAN), a local area network (LAN), a public switched telephone network (PSTN), or any combination thereof, including other types of communication networks. It should be understood that service provider system 120 could also provide communication services to communication system 110.

It should be understood that communication system 110 could be located at the premises of a customer of the operator of service provider system 120. For example, the owner or operator of service provider system 120 could be a telecommunications carrier and the owner or operator of communication system 110 could be a customer of the telecommunications carrier.

Figure 2:
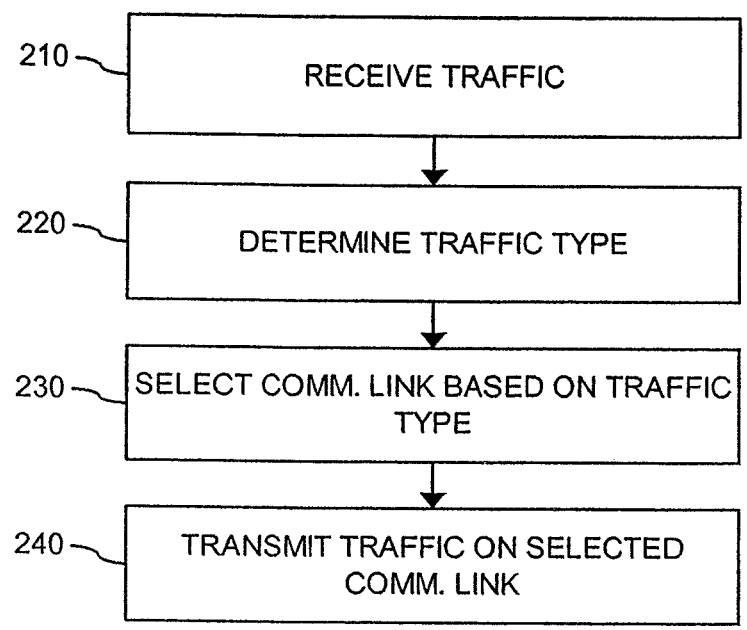
FIG. 2 illustrates the operation of a communication system in an embodiment of the invention.
Figure 3:
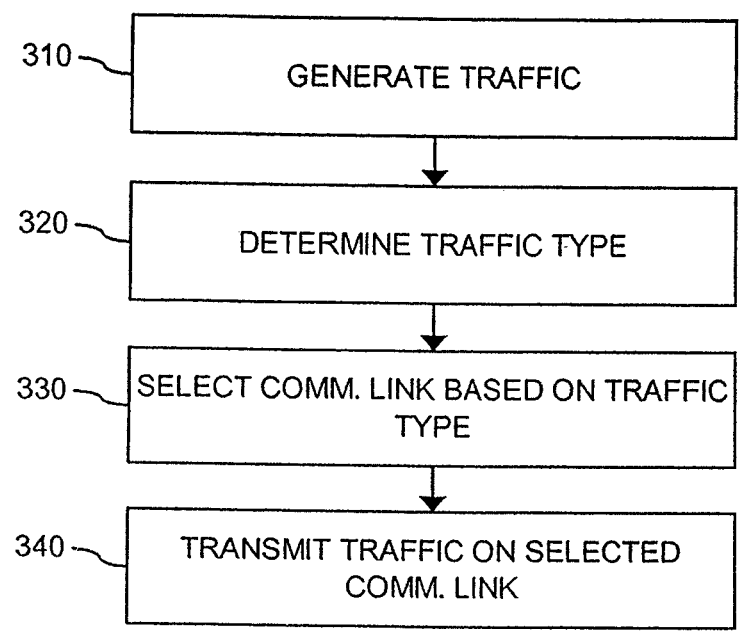
FIG. 3 illustrates the operation of a service provider system in an embodiment of the invention.

In operation, communication system 110 establishes communication sessions with other communication systems located within service provider system 120 or communication network 130. For example, communication system 110 could establish voice, video, or data communication sessions with other communication systems. During such sessions, communication system 110 exchanges session traffic with service provider system 120 over communication links 101 and 102. Depending upon the type of the traffic, either communication link 101 or communication link 102 is utilized. FIGS. 2 and 3 further illustrate the operation of service provider system 120 and communication system 110.

FIG. 2 illustrates the operation of service provider system 120 in an embodiment of the invention whereby session traffic is received by service provider system 120 from communication network 130 and transferred to communication system 110. To begin, service provider system 120 receives traffic from communication network 130 (Step 210). Next, service provider system 120 processes the traffic to determine the traffic type (Step 220). A traffic type is a category of data included in a network session or data packet that may be established by a network provider. For example, network sessions or individual data packets may be categorized based on protocol, application, quality of service, applicable service level, encryption level, required delivery time, acceptable latency, acceptable packet loss, or any other suitable parameter associated with the data being communicated. Categories of data forming traffic types are not selected only based on destination network IP address similar to how a router chooses to direct data, but are instead based on the type of data being communicated and the desire to treat the communication of a particular type of data different from other data types. Based on the traffic type, service provider system 120 selects either of communication links 101 or 102 over which to transmit the traffic (Step 230). Service provider system 120 then transmits the traffic over the selected communication link to communication system 110.

In an embodiment, service provider system 120 could select communication link 101 for certain types of traffic and select communication link 102 for other types of traffic. For example, service provider system 120 could select communication link 101 for best effort traffic and select communication link 102 for real-time traffic. In another example, service provider system 120 could select communication link 102 for security sensitive traffic, such as security certificates, login identifiers, or account information, as well as other types of security sensitive traffic. Service provider system 120 could select communication link 101 for non-security sensitive traffic, such as web pages or public video traffic, as well as other types of non-security sensitive traffic. The service provider system 120 may also choose to split traffic sessions for communications where transmitted sessions are sent by an origination network node to a destination network node via one link, and the destination network node transmits the same session back to the origination network node via another link thereby making the session interception and insertion attacks more difficult. More particularly, such split traffic sessions may be used to make it more difficult for third party software to monitor and copy network data used to authenticate a user login, password, or other information including portions of data communicated between the two network nodes. For example, when a user logs in with a network client device located at a first network node to a third party server located at a second network node, an authentication or security protocol may be used that includes data communicated both from the network client device to the server and from the server back to the network client device. If each of such communications takes place on a different network link, it becomes very difficult to detect the data communicated in both directions using the authentication protocol. Thus, someone wishing to copy the communicated data to obtain unauthorized access to the user's account on the third party server would have to obtain data communicated across two different network links and correlate the data to recreate the data used in the protocol.

FIG. 3 illustrates the operation of communication system 110 in an embodiment of the invention whereby session traffic is generated and transmitted from communication system 110 to service provider system 120. To begin, communication system 110 generates traffic for transmission to service provider system 120 (Step 310). Next, communication system 110 determines the type of the traffic (Step 320). Based on the traffic type, communication system 110 selects one of either communication link 101 or communication link 102 over which to transmit the traffic to service provider system 120 (Step 330). Lastly, communication system 110 transmits the traffic on the selected communication link.

In an embodiment, communication system 110 could select communication link 101 for certain types of traffic and select communication link 102 for other types of traffic. For example, communication system 110 could select communication link 101 for best effort traffic and select communication link 102 for real-time traffic. In another example, communication system 110 could select communication link 102 for security sensitive traffic, such as passwords, security keys, login identifiers, or account information, as well as other types of security sensitive traffic. Communication system 110 could select communication link 101 for non-security sensitive traffic, such as web pages or public video traffic, as well as other types of non-security sensitive traffic. The system may also choose to split traffic sessions for communications where transmitted sessions are sent via one link, and the far end transmits the same session via another link thereby making the session interception and insertion attacks more difficult.

In an embodiment, service provider system 120 and communication system 110 could communicate to mutually determine what types of traffic to associate with communication links 101 and 102. For example, during session initiation and setup, service provider system 120 and communication system 110 could agree that upstream traffic sent from service provider system 120 to communication system 110 should be transmitted over communication link 101, while downstream traffic should be transmitted over communication link 102.

In another example, service provider system 120 and communication system 110 could determine during session initiation and setup that certain types of traffic should be transmitted on communication link 101, while other types of traffic should be transmitted on communication link 102. For example, service provider system 120 and communication system 110 could determine that any account information, or signaling control sessions should be transmitted on communication link 102, while any public content should be transmitted on communication link 101.

Figure 4:
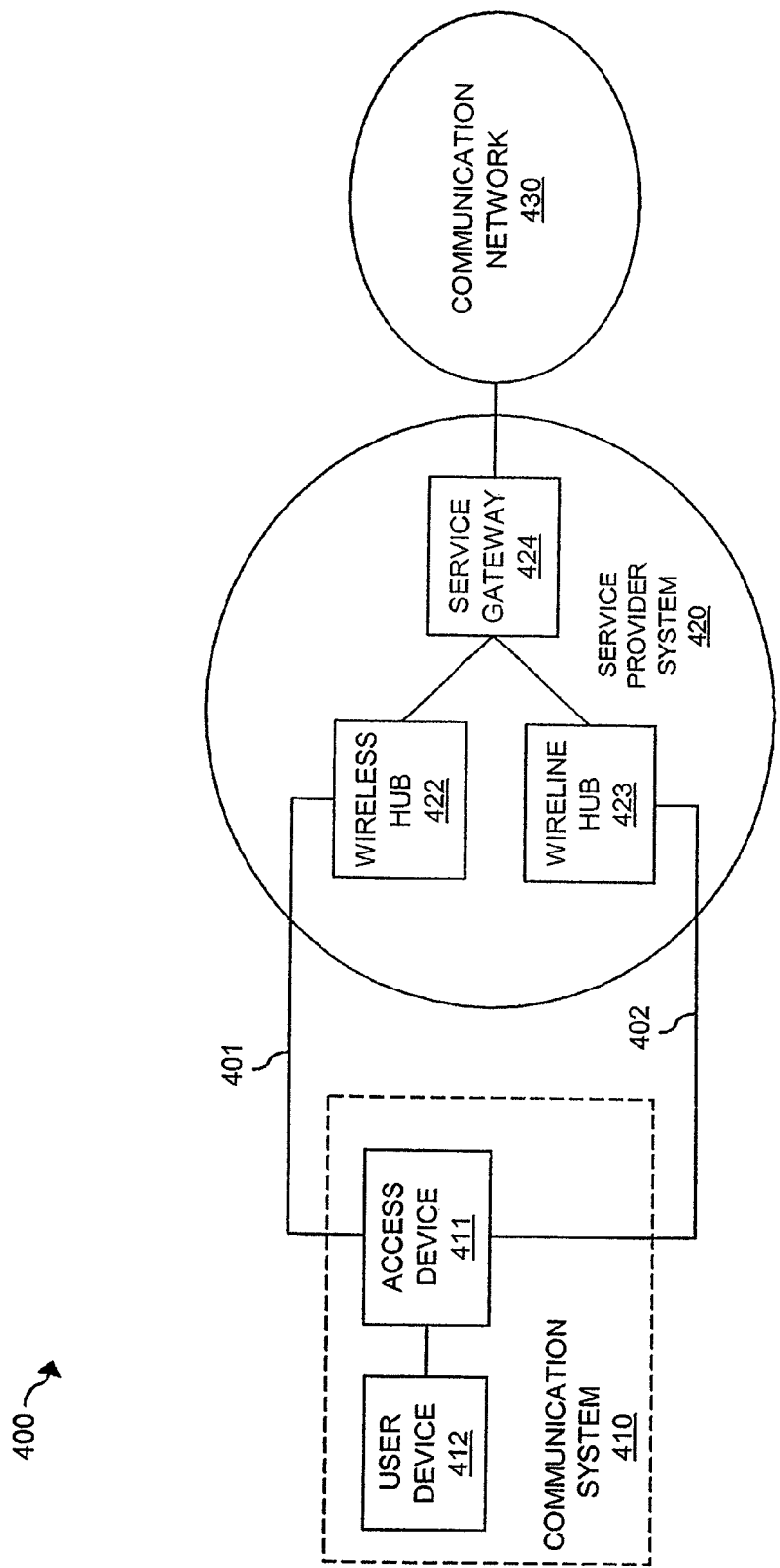
FIG. 4 illustrates a communication network in an embodiment of the invention.

FIG. 4 illustrates communication network 400 in an embodiment of the invention. Communication network 400 includes communication system 410, service provider system 420, and communication network 430. Communication system 410 includes access device 411 and user device 412. Service provider system 420 includes wireless hub 422, wireline hub 423, and service gateway 424. Access device 411 is coupled to wireless hub 422 by wireless communication link 401 and to wireline hub 423 by wireline link 402.

Access device 411 could be any device capable of providing user device 412 with access to service provider system over either wireless link 401 or wireline link 402. Access device 411 could include a wireless and a wireline interface for transmitting and receiving traffic on wireless link 401 and wireline link 402.

Wireless link 401 could be a wireless local area network (LAN) link, such as an 802.11a, 802.11b, or 802.11g link or other wireless technology. Similarly, wireless link 401 could be a cellular wireless link, such as a code division multiple access (CDMA), general services mobile (GSM), or time division multiple access (TDMA) link. In addition, wireless link 401 could be a wide area network (WAN) link, such as a WiMAX link. Other types of wireless links are possible. Wireline link 402 could be a wireline LAN or WAN link, such as a cable or DSL link. Other types of wireline links are possible.

User device 412 could be any device capable of communicating with service provider system 420 and communication network 430 through access device 411. User device 412 could be, for example, a personal computer, a mobile phone, or a personal computing device, as well as other types of user devices.

Wireless hub 422 could be any system or collection of systems capable of transmitting and receiving traffic to and from access device 411 over wireless link 401. Wireless hub 422 could be, for example, a wireless base station, a base transceiver station, or a mobile switching center (MSC), as well as other types of wireless hubs or any combination thereof.

Wireline hub 423 could be any system or collection of systems capable of transmitting and receiving traffic to and from access device 411 over wireless link 402. Wireline hub 423 could be, for example, digital subscriber line multiplexer (DSLAM) or a cable hub or head-end, as well as other types of wireline hubs.

Service gateway 424 could be any system or collection of systems capable of interfacing traffic between wireless hub 422 and communication network 430. Service gateway 424 could also be any system or collection of systems capable of interfacing traffic between wireline hub 423 and communication network 430, or alternatively communicating over multiple wireless or wireline communication links.

Figure 5:
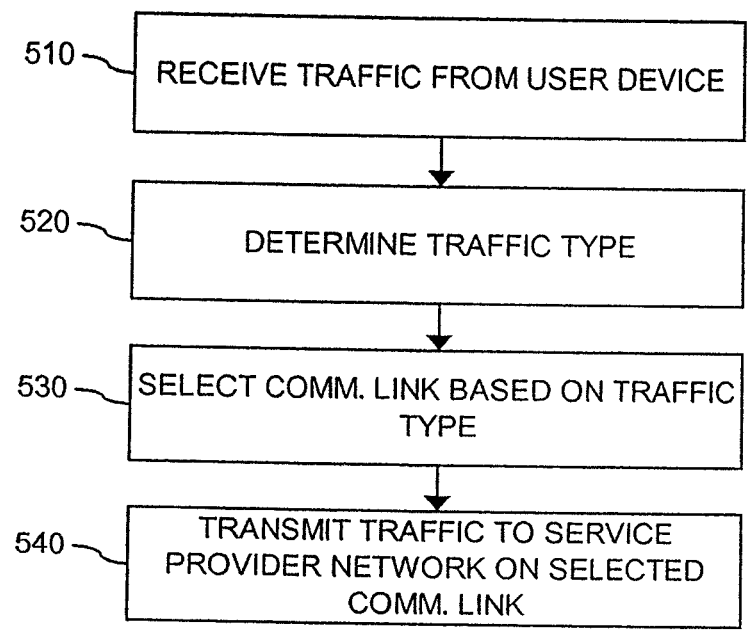
FIG. 5 illustrates the operation of an access device in an embodiment of the invention.

FIG. 5 illustrates the operation of access device 411 in an embodiment of the invention. To begin, access device 411 receives traffic from user device 412 (Step 510). Next, access device 411 processes the traffic to determine the type of the traffic (Step 520). Access device 411 then selects one of either wireless link 401 or wireline link 402 based on the traffic type (Step 530). Lastly, access device 411 transmits the traffic on the selected link (Step 540).

In an embodiment, access device 411 could select wireless link 401 for certain types of traffic and select wireline link 402 for other types of traffic. For example, access device 411 could select wireless link 401 for best effort traffic and select wireline link 402 for real-time traffic. In another example, access device 411 could select wireline link 402 for security sensitive traffic, such as passwords, security keys, login identifiers, or account information, as well as other types of security sensitive traffic. Access device 411 could select wireless link 401 for non-security sensitive traffic, such as web pages or public video traffic, as well as other types of non-security sensitive traffic. The system may also choose to split traffic sessions for communications where transmitted sessions are sent via one link, and the far end transmits the same session via another link thereby making the session interception and insertion attacks more difficult.

Figure 6:
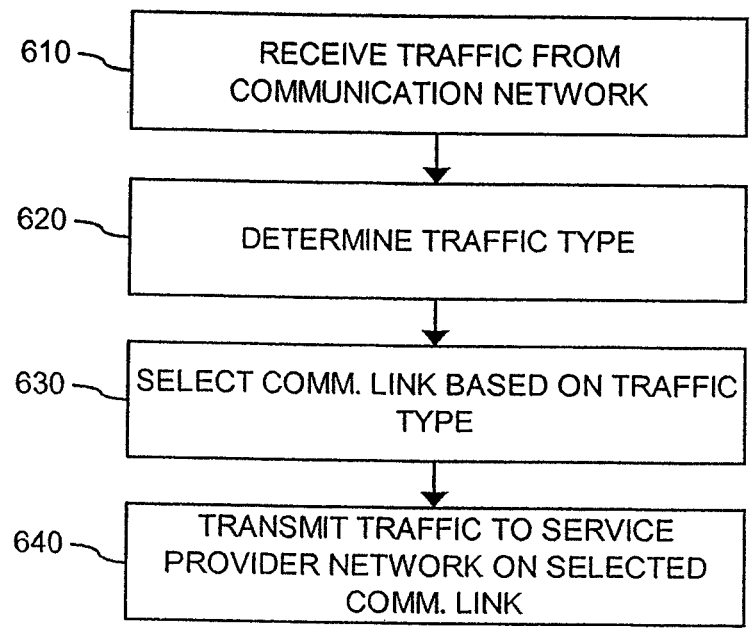
FIG. 6 illustrates the operation of a service provider system in an embodiment of the invention.

FIG. 6 illustrates the operation of service gateway 424 in an embodiment of the invention. To begin, service gateway 424 receives traffic from communication network 430 destined for user device 412 (Step 610). Next, service gateway 424 processes the traffic to determine the type of the traffic (Step 620). Service gateway 424 then selects one of either wireless link 401 or wireline link 402 based on the traffic type (Step 630). Lastly, service gateway 424 transmits the traffic on the selected link (Step 640). If wireless link 401 is selected, service gateway 424 transfers the traffic to wireless hub 422 for transmission to access device 411. If wireline link 402 is selected, service gateway 424 transfers the traffic to wireline hub 423 for transmission to access device 411.

In an embodiment, service gateway 424 could select wireless link 401 for certain types of traffic and select wireline link 402 for other types of traffic. For example, service gateway 424 could select wireless link 401 for best effort traffic and select wireline link 402 for real-time traffic. In another example, service gateway 424 could select wireline link 402 for security sensitive traffic, such as security certificates, login identifiers, or account information, as well as other types of security sensitive traffic. Service gateway 424 could select wireless link 401 for non-security sensitive traffic, such as web pages or public video traffic, as well as other types of non-security sensitive traffic. The system may also choose to split traffic sessions for communications where transmitted sessions are sent via one link, and the far end transmits the same session via another link thereby making the session interception and insertion attacks more difficult.

In an embodiment, service gateway 424 and access device 411 could communicate to mutually determine what types of traffic to associate with wireless link 401 and wireline link 402. For example, during session initiation and setup, service gateway 424 and access device 411 could agree that upstream traffic sent from service gateway 424 to access device 411 should be transmitted over wireless link 401, while downstream traffic should be transmitted over wireline link 402.

In another example, service gateway 424 and access device 411 could determine during session initiation and setup that certain types of traffic should be transmitted on wireless link 401, while other types of traffic should be transmitted on wireline link 402. For example, service gateway 424 and access device 411 could determine that any account information should be transmitted on wireline link 402, while any public content should be transmitted on wireless link 401.

Figure 7:
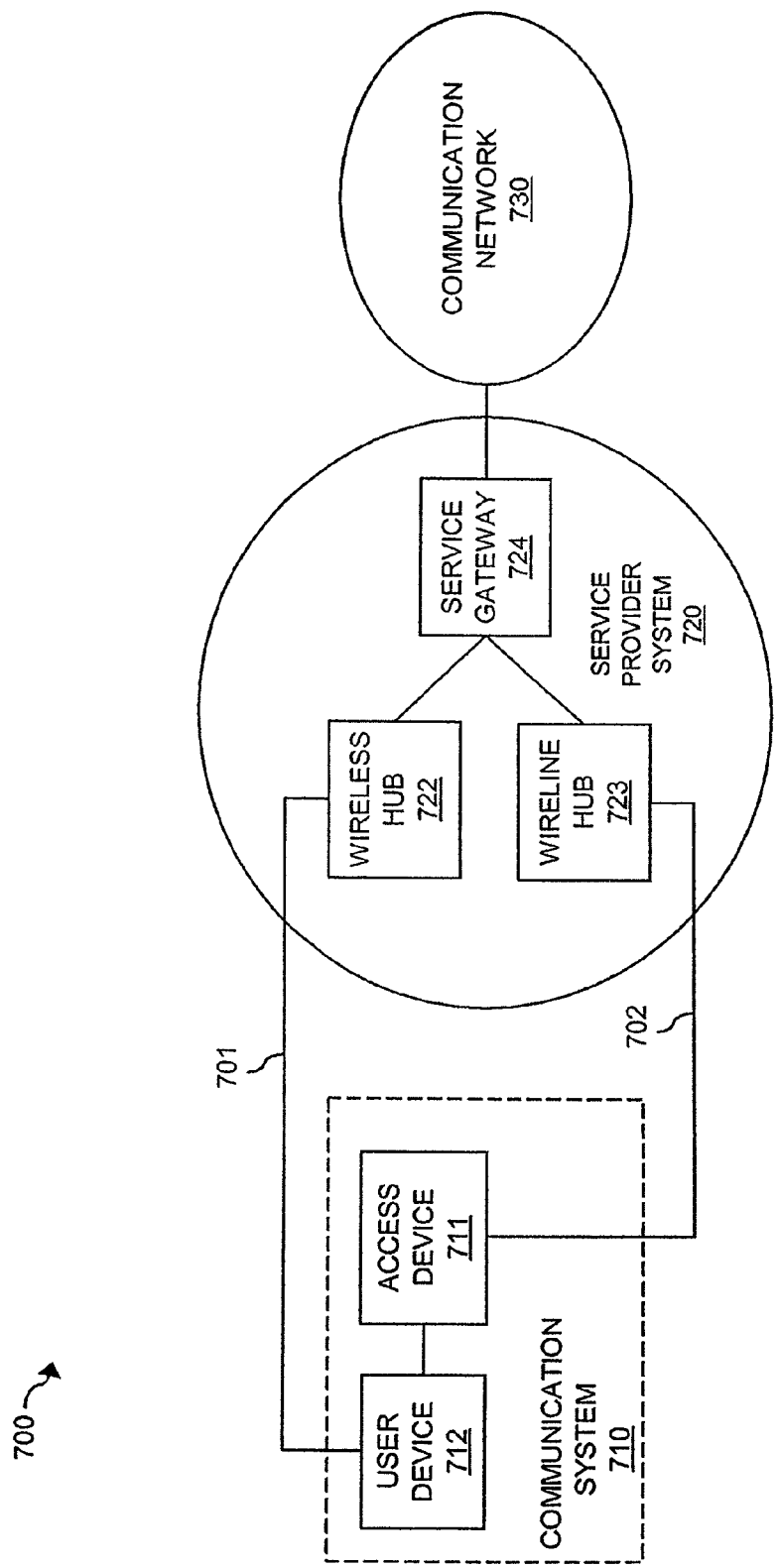
FIG. 7 illustrates a communication network in an embodiment of the invention.

FIG. 7 illustrates communication network 700 in an embodiment of the invention. Communication network 700 includes communication system 710, service provider system 720, and communication network 730. Communication system 710 includes access device 711 and user device 712. Service provider system 720 includes wireless hub 722, wireline hub 723, and service gateway 724. Access device 711 is coupled to wireless hub 722 by wireless communication link 701 and to wireline hub 723 by wireline link 702.

Access device 711 could be any device capable of providing user device 712 with access to service provider system over wireline link 702. For example, access device could be a cable or DSL modem, as well as other types of access devices.

Wireless link 701 could be a wireless local area network (LAN) link, such as an 802.11a, 802.11b, or 802.11g link. Similarly, wireless link 701 could be a cellular wireless link, such as a code division multiple access (CDMA), general services mobile (GSM), or time division multiple access (TDMA) link. In addition, wireless link 701 could be a wide area network (WAN) link, such as a WiMAX link. Other types of wireless links are possible. Wireline link 702 could be a wireline LAN or WAN link, such as a cable or DSL link. Other types of wireline links are possible.

User device 712 could be any device capable of communicating with service provider system 720 and communication network 730 through either access device 711 or over wireless link 701. User device 712 could be, for example, a personal computer, a mobile phone, or a personal computing device, as well as other types of user devices.

Wireless hub 722 could be any system or collection of systems capable of transmitting and receiving traffic to and from user device 712 over wireless link 701. Wireless hub 722 could be, for example, a wireless base station, a base transceiver station, or a mobile switching center (MSC), as well as other types of wireless hubs or any combination thereof.

Wireline hub 723 could be any system or collection of systems capable of transmitting and receiving traffic to and from access device 711 over wireline link 702. Wireline hub 723 could be, for example, a digital subscriber line multiplexer (DSLAM) or a cable hub or head-end, as well as other types of wireline hubs.

Service gateway 724 could be any system or collection of systems capable of interfacing traffic between wireless hub 722 and communication network 730. Service gateway 724 could also be any system or collection of systems capable of interfacing traffic between wireline hub 723 and communication network 730.

Figure 8:
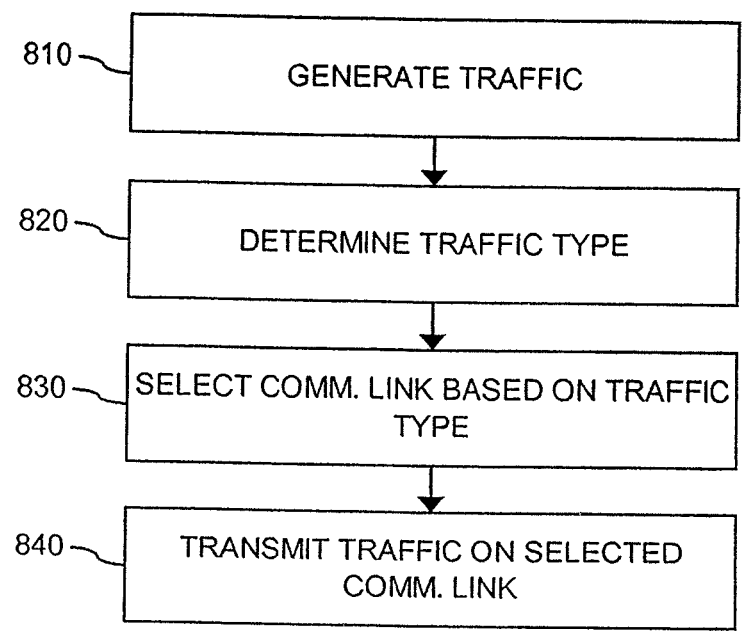
FIG. 8 illustrates the operation of a user device in an embodiment of the invention.

FIG. 8 illustrates the operation of user device 712 in an embodiment of the invention. To begin, user device 712 generates traffic for transmitting to service provider system 720 (Step 810). Next, user device 712 processes the traffic to determine the type of the traffic (Step 820). User device 712 then selects one of either wireless link 701 or wireline link 702 based on the traffic type (Step 830). Lastly, user device 712 transmits the traffic on the selected link. If wireless link 701 is selected, user device 712 transmits the traffic over wireless link 701 to wireless hub 722. If wireline link 702 is selected, user device 712 transmits the traffic to access device 711. Access device 711 then transmits the traffic over wireline link 702 to wireline hub 423.

In an embodiment, user device 712 could select wireless link 701 for certain types of traffic and select wireline link 702 for other types of traffic. For example, user device 712 could select wireless link 701 for best effort traffic and select wireline link 702 for real-time traffic. In another example, user device 712 could select wireline link 702 for security sensitive traffic, such as passwords, security keys, login identifiers, or account information, as well as other types of security sensitive traffic. User device 712 could select wireless link 701 for non-security sensitive traffic, such as web pages or public video traffic, as well as other types of non-security sensitive traffic. The system may also choose to split traffic sessions for communications where transmitted sessions are sent via one link, and the far end transmits the same session via another link thereby making the session interception and insertion attacks more difficult.

Figure 9:
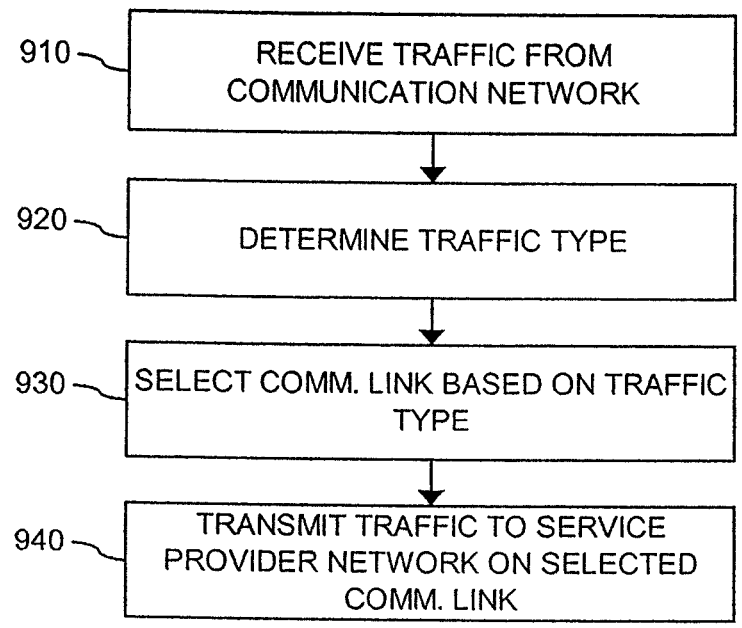
FIG. 9 illustrates the operation of a service provider system in an embodiment of the invention.

FIG. 9 illustrates the operation of service gateway 724 in an embodiment of the invention. To begin, service gateway 724 receives traffic from communication network 730 destined for user device 712 (Step 910). Next, service gateway 724 processes the traffic to determine the type of the traffic (Step 920). Service gateway 724 then selects one of either wireless link 701 or wireline link 702 based on the traffic type (Step 930). Lastly, service gateway 724 transmits the traffic on the selected link (Step 940). If wireless link 701 is selected, service gateway 724 transfers the traffic to wireless hub 722 for transmission to user device 712. If wireline link 702 is selected, service gateway 724 transfers the traffic to wireline hub 723 for transmission to user device 712.

In an embodiment, service gateway 724 could select wireless link 701 for certain types of traffic and select wireline link 702 for other types of traffic. For example, service gateway 724 could select wireless link 701 for best effort traffic and select wireline link 702 for real-time traffic. In another example, service gateway 724 could select wireline link 702 for security sensitive traffic, such as security certificates, login identifiers, or account information, as well as other types of security sensitive traffic. Service gateway 724 could select wireless link 701 for non-security sensitive traffic, such as web pages or public video traffic, as well as other types of non-security sensitive traffic.

Figure 10:
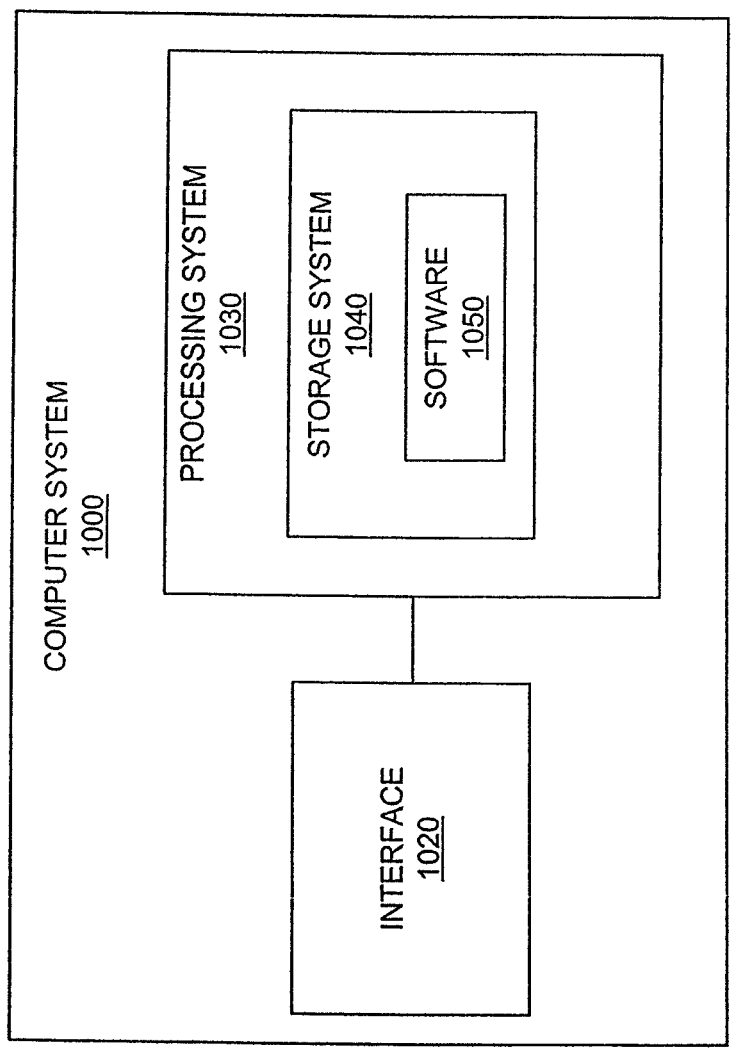
FIG. 10 illustrates a computer system in an embodiment of the invention.

FIG. 10 illustrates computer system 1000 in an embodiment of the invention. Computer system 1000 includes interface 1020, processing system 1030, storage system 1040, and software 1050. Storage system 1040 stores software 1050. Processing system 1030 is linked to interface 1020. Computer system 1000 could be comprised of a programmed general-purpose computer, although those skilled in the art will appreciate that programmable or special purpose circuitry and equipment may be used. Computer system 1000 may use a client server architecture where operations are distributed among a server system and client devices that together comprise elements 1020-1050.

Interface 1020 could comprise a network interface card, modem, port, or some other communication device. Interface 1020 may be distributed among multiple communication devices. Interface 1030 could comprise a computer microprocessor, logic circuit, or some other processing device. Processing system 1030 may be distributed among multiple processing devices. Storage system 1040 could comprise a disk, tape, integrated circuit, server, or some other memory device. Storage system 1040 may be distributed among multiple memory devices.

Processing system 1030 retrieves and executes software 1050 from storage system 1040. Software 1050 may comprise an operating system, utilities, drivers, networking software, and other software typically loaded onto a general-purpose computer. Software 1050 could also comprise an application program, firmware, or some other form of machine-readable processing instructions. When executed by the processing system 1030, software 1050 directs processing system 1030 to operate as described above for communication system 110, service provider system 120, access device 411, service gateway 424, access device 711, user device 712, and service gateway 724.

What is claimed is:

1. A method for splitting a communications session over a network, the method comprising:
designating a first unidirectional communications link as one of a wireless link or a wireline link to communicate a first data packet from a first network device to a second network device, the first data packet being associated with the communications session;
based on a determination that the first unidirectional communications link is designated as a wireless link, designating a second unidirectional communications link as a wireline link to communicate a second data packet from the second network device to the first network device, the second data packet being associated with the communications session; and
based on a determination that the first unidirectional communications link is designated as a wireline link, designating the second unidirectional communications link as a wireless link to communicate the second data packet from the second network device to the first network device,
wherein the first data packet does not traverse the second communications link and the second data packet does not traverse the first communications link, and wherein the first communications link is of a different type of communication link than that of the second communications link.

2. The method of claim 1, wherein all data packets communicated from the first network device to the second network device during the communications session are designated to be communicated on the first communications link.

3. The method of claim 1, wherein the communications session is associated with authenticating a user of the first network device to allow the user to access data stored on the second network device.

4. The method of claim 1, wherein the communications session is associated with authenticating a user of the first network device to allow the user to access data stored on the second network device, and wherein the first data packet is an identifier associated with the user and the second data packet is a confirmation of such identifier.

5. The method of claim 1, wherein a type of communication link for the first communication link is selected based on a traffic type.

* * * * *